United States Patent
Matyska et al.

(10) Patent No.: US 11,699,160 B2
(45) Date of Patent: Jul. 11, 2023

(54) METHOD, USE THEREOF, COMPUTER PROGRAM PRODUCT AND SYSTEM FOR FRAUD DETECTION

(71) Applicant: KBC Groep NV, Brussels (BE)

(72) Inventors: Tomáš Matyska, Hlubočepy (CZ); Omkar Kulkarni, Heverlee (BE); Tien Le, Kraainem (BE); Barak Chizi, Woluwe (BE); Vasileios Stathokostopoulos, Athens (GR); Frans Thierens, Hamme (BE); Shahul Hameed, Tienen (BE); Bartel Puelinckx, Roosdaal (BE); Johan Thijs, Betekom (BE); Kevin Vanderspikken, Schaerbeek (BE)

( * ) Notice: Subject to any disclaimer, the term of this patent is extended or adjusted under 35 U.S.C. 154(b) by 0 days.

(21) Appl. No.: 17/175,055

(22) Filed: Feb. 12, 2021

(65) Prior Publication Data

US 2021/0248611 A1    Aug. 12, 2021

(30) Foreign Application Priority Data

Feb. 12, 2020 (EP) .................................. 20157029
Jul. 24, 2020 (EP) .................................. 20187612

(51) Int. Cl.
| | | |
|---|---|---|
| *G06Q 20/40* | (2012.01) | |
| *G06F 16/9035* | (2019.01) | |
| *G06N 3/08* | (2023.01) | |
| *G06Q 20/02* | (2012.01) | |

(52) U.S. Cl.
CPC ..... *G06Q 20/4016* (2013.01); *G06F 16/9035* (2019.01); *G06N 3/08* (2013.01); *G06Q 20/027* (2013.01)

(58) Field of Classification Search
None
See application file for complete search history.

(56) References Cited

U.S. PATENT DOCUMENTS

| | | | | |
|---|---|---|---|---|
| 601,852 | A * | 4/1898 | Gallway | G07F 17/14 |
| | | | | 194/250 |
| 7,827,045 | B2 | 11/2010 | Madill, Jr. et al. | |
| 8,423,491 | B2 * | 4/2013 | Kitajima | G06F 21/577 |
| | | | | 706/45 |
| 10,601,852 | B2 * | 3/2020 | Takahashi | H04L 41/142 |
| 2005/0222929 | A1 * | 10/2005 | Steier | G06Q 40/00 |
| | | | | 705/35 |
| 2013/0018796 | A1 * | 1/2013 | Kolhatkar | G06Q 20/405 |
| | | | | 705/44 |
| 2014/0058763 | A1 * | 2/2014 | Zizzamia | G06Q 10/10 |
| | | | | 705/4 |

(Continued)

OTHER PUBLICATIONS

Hodge & Austin, A Survey of Outlier Detection Methodologies, Artificial Intelligence Review, 2004.

(Continued)

*Primary Examiner* — Bruce I Ebersman
*Assistant Examiner* — Matthew Cobb
(74) *Attorney, Agent, or Firm* — Hodgson Russ LLP

(57) ABSTRACT

The current invention pertains to a computer-implemented method, a method, a use thereof, a computer system and a computer program product for determining a potential for anomalous activity by a suspect user, particularly for detecting fraud and most particularly for detecting money laundering.

20 Claims, 2 Drawing Sheets

(56) References Cited

U.S. PATENT DOCUMENTS

| | | | |
|---|---|---|---|
| 2015/0046216 A1* | 2/2015 | Adjaoute | G06Q 20/384 |
| | | | 705/7.29 |
| 2016/0210631 A1* | 7/2016 | Ramasubramanian | ...................... |
| | | | G06Q 20/4016 |
| 2017/0178139 A1* | 6/2017 | Gieseke | G06Q 30/0185 |
| 2019/0220863 A1* | 7/2019 | Novick | G06Q 20/10 |

OTHER PUBLICATIONS

Chandola et al., Anomaly Detection: A Survey, ACM Computing Surveys, 2007.

Chandola et al., Anomaly Detection for Discrete Sequences: A Survey, ACM Computing Surveys, 2009.

Sun et al., Detecting Anomalous User Behavior Using an Extended Isolation Forest Algorithm: An Enterprise Case Study, 2016, arXiv:1609.06676.

Rosvall et al., Different Approaches to Community Detection, 2017, arXiv:1712.06468.

* cited by examiner

METHOD, USE THEREOF, COMPUTER PROGRAM PRODUCT AND SYSTEM FOR FRAUD DETECTION

CROSS-REFERENCE TO RELATED APPLICATIONS

This application claims priority to European Patent Application No. 20157029.8 filed on Feb. 12, 2020 and European Patent Application No. 20187612.5 filed on Jul. 24, 2020, the disclosures of which are hereby incorporated by reference.

FIELD OF THE INVENTION

The present invention pertains to the detection of anomalous activity, in particular the detection of fraud such as the detection of money laundering.

BACKGROUND

Fraud detection is one of the most important areas for financial institutions. It is required by law and fines for non compliance can be up to 10% of the revenue of an institution.

Historically, branch employees were key persons to detect suspicious transactions. However, due to an increasing digitalization and volume of transactions, the branch employees lost their ability to fully understand the customer. Therefore, software systems were introduced to monitor transactions.

Software systems known in the art are generally rule-based systems and mainly rely on expert knowledge. Alerts are generated based on these rules which are thereafter investigated by compliance officers. These systems are limited in their accuracy as they only take into account a limited set of inputs. Furthermore, as such systems are rule-base, they are non-dynamic and hard to update. U.S. Pat. No. 7,827,045 describes such rule-based software system.

There is a need in the art for improved anomaly detection systems suitable for fraud detection. In particular, there is need for anomaly detection systems which are dynamic and allow detection of anomalies on multiple fronts.

The present invention aims to resolve at least some of the technical problems mentioned above.

SUMMARY OF THE INVENTION

In a first aspect, the invention relates to a computer-implemented method for determining a potential for anomalous activity.

In a second aspect, the invention relates to a method or detecting anomalous activity.

In a third aspect, the invention relates to a computer program product for determining a potential for anomalous activity.

In a fourth aspect, the invention relates to a computer system for determining a potential for anomalous activity.

In a fifth aspect, use of the first aspect computer-implemented method and/or the second aspect method for fraud detection.

The present invention is advantageous as it provides for a full spectrum analysis for detection of anomalous activities. This is particularly useful for fraud detection.

Further advantageous, embodiments, examples and figures of the present invention are discussed hereafter.

DETAILED DESCRIPTION OF THE INVENTION

Figure 1:
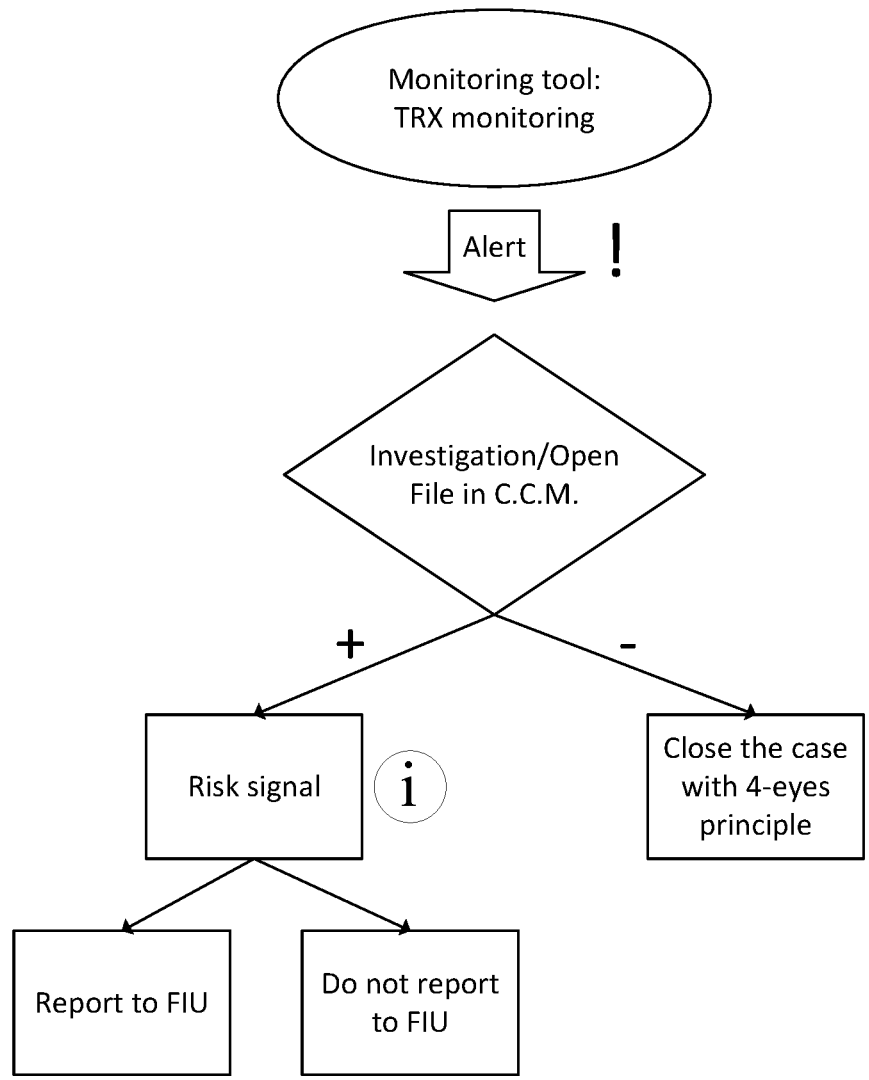
FIG. 1 shows a schematic overview of a method for fraud detection known in the state of the art.

The current invention pertains to a computer-implemented method, a method, a use thereof, a computer system and a computer program product. In what follows, the invention will be described in detail, preferred embodiments are discussed and the invention will be illustrated by means of non-limitative examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

"A", "an", and "the," as used herein, refers to both singular and plural referents unless the context clearly dictates otherwise. By way of example, "a user" refers to one or more than one user.

"Comprise," "comprising," and "comprises" and "comprised of," as used herein, are synonymous with "include," "including," "includes" or "contain," "containing," "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

Whereas the terms "one or more" or "at least one," such as one or more or at least one member(s) of a group of members, is clear per se, by means of further exemplification, the term encompasses inter alia a reference to any one of said members, or to any two or more of said members, such as, e.g., any 3, 4, 5, 6 or 7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention relates to a computer-implemented method for determining a potential for anomalous activity by a suspect user. The method for determining a potential for anomalous activity by a suspect user preferably comprising the step of (a) receiving a plurality of user profiles. Preferably, wherein each user profile is associated to a use. Preferably, wherein each user profile comprises a plurality of transactions associated to said user. Preferably, each transaction comprising a plurality of transaction attributes. The method preferably further comprising the step of (b) calculating an anomaly score for each of the received plurality user profiles by means of an anomaly detection algorithm. The anomaly detection algorithm preferably being trained based on one or more transaction attributes of a plurality transactions comprised by a plurality of user profiles. The trained anomaly detection algorithm preferably being at least one or more of an unsupervised anomaly detection algorithm or a supervised classification algorithm. The method preferably further comprising (c) determining a community structure for the received plurality of user profiles based at least in part on the transactions comprised by said user profiles. The determined community structure preferably comprising a plurality of nodes interconnected via weighted edges. Preferably, wherein each node is associated to a user profile and the calculated anomaly score for said user profile. Preferably, wherein the weight of each edge interconnecting two or more nodes is at least based in part on a number of transactions between the user profiles associated with the interconnected nodes. The method preferably further comprising the step of (d) calculating a network anomaly score for a user profile associated to the suspect user. Preferably, wherein said user profile is comprised by the received plurality user profiles. Preferably, wherein the network anomaly score for said user profile is based at least in part on the anomaly score calculated for one or more user profiles associated with nodes in the determined community structure which are interconnected via an edge to the node of said user profile. Preferably, wherein the network anomaly score for said user profile is based at least in part on the weight of each respective interconnecting edge. The method preferably further comprising the step of (e) calculating a potential for anomalous activity by the suspect user by means of combining the calculated anomaly score and the network anomaly score of the user profile associated to said suspect user. Preferably, steps a) trough e) of the above method are performed in chronological order.

In a second aspect, the invention relates to a method for detecting anomalous activity. The method for detecting anomalous activity preferably comprising the step of providing a plurality of user profiles to a computer system. Preferably, wherein each user profile is associated to a user. Preferably, wherein each user profile comprises a plurality of transactions by said user. Preferably, each transaction comprising a plurality of transaction attributes. The method preferably further comprising the step of executing the computer-implemented method according to a first aspect of the invention on the computer system. Preferably, wherein the computer-implemented method is provided in a computer program product according to a third aspect of the invention. Preferably, wherein the computer system is the computer system according to a fourth aspect of the invention. The method preferably further comprising the step of obtaining the calculated potential for anomalous activity by the suspect user. The method preferably further comprising the step of determining whether the suspect user is potentially anomalous by means of comparing the calculated potential for anomalous activity by the suspect user to an anomaly threshold value. Preferably wherein it is determined that the suspect user is potentially anomalous when the calculated potential for fraudulent activity exceeds said anomaly threshold value.

In a third aspect, the invention relates to a computer program product for determining a potential for anomalous activity by a suspect user. The computer program product comprising instructions. These instructions cause, when executed by a computer, the computer to carry out the computer-implemented method for determining a potential for anomalous activity by a suspect user according to a first aspect of the invention. In a fourth aspect, the invention relates to a computer system for determining a potential for anomalous activity by a suspect user. The computer system preferably being configured for performing the computer-implemented method for determining a potential for anomalous activity by a suspect user according to a first aspect of the invention.

In a fifth aspect, the invention relates to a use of the computer-implemented method according to the first aspect of the invention and/or the method according to the second aspect of the invention for fraud detection. Preferably, the above computer-implemented method and/or method being used for detection of money-laundering.

The present disclosure provides a computer-implemented method, a method, a use thereof, a computer program product and a computer system for the detection of anomalous activity. A person having ordinary skill in the art will appreciate that the computer-implemented method is implemented in the computer program product and executed using the computer system. A person having ordinary skill in the art will furthermore appreciate that the method is suited for using the computer-implemented method, the computer program product and the computer system. In what follows, the five aspects of the present invention are therefore treated together.

The subject of the invention generally relates to detecting anomalous activity. Specifically, detecting anomalous activity comprised in transactions performed by a suspect user. Preferably, the term anomalous activity herein is to be interpreted as suspicious activity. "User," as used herein, may refer to a natural person or non-natural person, or a legal person or non-legal person using a provided platform such as a banking service. A natural person may refer to a person in the legal meaning, i.e. a person who has its own legal personality, and is an individual human being. A legal person may refer to an entity or organisation such as a private entity, e.g. a business entity or non-governmental organization, or a public entity, e.g. a government organization. A non-natural person may refer to any corporate body, unincorporated firm, partnership or body with legal personality except an individual. A platform may comprise electronic and non-electronic services. "Suspect user," as used herein, refers to a user accused or suspected of being anomalous. Each user may or may not be a suspect user. No prior indication for anomalous activity is required for a user to be a suspect user. According to a specific embodiment, "suspect user," as used herein, may or may not refer to a group, cluster or community of users. The suspect users in a group, cluster or community may or may not be randomly associated. The suspect users in a group, cluster or community may or may not be associated by one or more parameters used in determining the community structure.

"Anomaly detection," as used herein, refers to a term known in the state of the art, which is generally referred to as a method to learn the characteristics of a given data set in order to be sufficiently capable of distinguishing anomalous data points from normal ones. Generally, anomalies or outliers are considered to be exceptions or peculiarities in the data that do not conform to the normal or expected behaviour of the majority. When visualizing the data, anomalies are identified by being relatively small in number and lying apart from the main bulk of data. Note that anomaly detection is related to research fields such as outlier detection and novelty detection, and therefore the application of some detection methods is often found across these fields. In what follows, the detailed description and examples are centred around unsupervised anomaly detection algorithms and supervised classification algorithms. Further information on outlier and anomaly detection methods is provided in "Hodge, V. J., & Austin, J. (2004); A Survey of Outlier Detection Methodologies; Artificial Intelligence Review, 22 (2), 85-126" and "Chandola, V., Banerjee, A., & Kumar, V. (2009); Anomaly Detection: A Survey; ACM Computing Surveys (CSUR), 41 (3), 15:1-15:58", below referred to as "Chandola et al. (2009)," the relevant portions of which are incorporated by reference.

Preferably, the subject of the invention relates to detecting fraud, wherein the fraud is indicated by detecting anomalies in transactions performed by a user. "Fraud," as used herein, refers to a term known in the state of the art, which is generally referred to as a deliberate deception perpetrated against or by a user for the purpose of financial gain or other benefits, for example obtaining a passport, travel document, or driver's license or mortgage fraud, where the perpetrator may attempt to qualify for a mortgage by way of false statements. Preferably, the subject of the invention relates to fraud by deliberate deception perpetrated against or by a user for the purpose of financial gain. Fraud furthermore may violate civil law or criminal law.

More preferably, the subject of the invention relates to detecting money laundering, wherein the money laundering is indicated by detecting anomalies in transactions performed by a user. "Money laundering," as used herein, refers to a term known in the state of the art, which is generally referred to as an illegal process of concealing the origins of money obtained illegally by passing it through a complex sequence of banking transfers or commercial transactions. The overall scheme of this process returns 'clean' money to the launderer in an obscure and indirect way. In a number of legal and regulatory systems, the term "money laundering" has become conflated with other forms of financial and business crime, and is sometimes used more generally to include misuse of the financial system (involving things such as securities, digital currencies, credit cards, and traditional currency), including terrorism financing and evasion of international sanctions.

It is furthermore noted that fraudulent behaviour strongly contrasts normal user behaviour. Therefore, it is expected that a fraudsters' behaviour would substantially deviate from normal user behaviour, especially as said fraudster is not aware of normal user behaviour patterns. Using an anomaly detection algorithm to detect fraud is thus an accurate approximation to determine which user is and is not associated to fraudulent behaviour, such as money laundering.

Each user herein is associated to a user profile. Each user profile comprising a plurality of transactions associated to said user. A transaction associated to a user should preferably be understood as each transaction wherein the user is the receiving entity and/or the sending entity. The transaction associated to the user preferably relates to a financial transaction. The transaction associated to the user may or may not relate to paper transactions such as a paper invoice or may or may not relate to an electronic transaction such as a transaction performed by means of an online application. The transaction performed by the user preferably relates to an electronic transaction. Each transaction comprising a least a plurality of transaction attributes. Preferably, wherein the plurality of transaction attributes comprise one or more transaction attributes selected from the group comprising a merchant type, transaction amount, transaction location or transaction time. The above transaction attributes are indicators for user behaviour which are especially relevant for fraud detection such as the detection of money laundering.

The merchant type comprised by the plurality of transaction attributes may comprise one or more labels indicative of whether a merchant adheres to a merchant anomaly-relating criterion. Preferably, wherein said merchant anomaly-relating criterion is fraud-related. Preferably, said merchant anomaly-relating criterion being indicative of historic fraudulent activity by a merchant.

The user profiles can be stored on any data-carrier readable by a computer. A data-carrier preferably comprising a memory and a data-communication port connected to said memory. The memory may or may not be connected to a processing unit of the computer via the data communication port. The data-carrier may for example be a USB-drive or an internal memory provided in the computer. The user profiles can accordingly be provided to, or received by, the computer by plugging in the USB-drive or for example by downloading the user profiles from an external database provided in a server which is connected to the computer via internet. Furthermore, the user profiles may be stored in any data format readable by the computer, such as any commercial spreadsheet format known in the art. The computer may be any computer systems known in the art which is suitable for data-processing.

An anomaly score is calculated for each of the received plurality user profiles by means of an anomaly detection algorithm. Preferably, the term anomalous score herein is to be interpreted as suspicious score. The anomaly detection algorithm being trained based on one or more transaction attributes of a plurality transactions comprised by a plurality of user profiles. Preferably, the trained anomaly detection algorithm being at least one or more of an unsupervised anomaly detection algorithm or a supervised classification algorithm. According to preferred embodiment, the anomaly detection algorithm preferably comprises both an unsupervised anomaly detection algorithm and a supervised classification algorithm.

In the context of the training of algorithms, following terms are used. The "training set" is the set of data observations (also called 'examples' or 'instances') that is used to train or to learn the model. An analytical model has parameters that need to be estimated in order to make good predictions. This translates into finding the optimal parameter values for the analytical model. For this reason, we use the training set to find or to estimate the optimal parameter values. Once we have a trained model, we can use it to make predictions. In a supervised classification task, also class labels (e.g., 'fraud', 'no fraud') are attached to each observation to estimate the optimal parameter values. This allows to train the algorithm on patterns that are helpful to identify fraud cases. The "validation set" relates to models with parameters that cannot be estimated directly from the data. Yet, in order to also find optimal values for those parameters (referred to as hyperparameters), the so-called validation set is used. Typically, a set of candidate values for the hyperparameters can be identified. One picks one candidate value, trains the model on the training set, and evaluates the prediction performance on the validation set. Then one picks the next candidate value and proceeds in a similar fashion until all candidate values have been tried out. In the end, for each candidate value a corresponding estimate of the prediction performance is obtained. Based on the performances estimated on the validation set, one can pick the one candidate value that corresponds to the optimal performance. The training set and validation set are preferably strictly separated in the whole process in order to obtain reliable performance estimates. That is, observations in the validation set cannot be in the training set (or test set for that matter). Alternatively, the training set and the validation set are not strictly separated. This is for example the case with cross-validation. The "test set," also "hold-out sample" is the set of data observations that is used to test whether the trained model makes good predictions. That is, in the model evaluation phase, one knows the true values of the test observations and one may check how many of the predicted values are correct by comparing them to the true values. It is important to note that here the class labels are only used to evaluate the prediction performance (e.g., accuracy) of the classification model. That is, observations in the test set cannot be in the training set or validation set. The strict separation is crucial, because one desired the model to make prediction about observations that have not been used in the training process. Only when this is guaranteed and the model shows a good performance, one can be certain that the model will also perform well on new, previously unseen data. The "holdout strategy" or "single train-test split strategy" refers to the simplest splitting because the data is divided into two sub-sets: one for training and one for testing. One may train the model with the former and then test it with the latter. Note that the train-test process is only done once. This data split is done randomly, i.e. observations are randomly assigned to belong to the training or test set. The performance is evaluated on the test set, usually for a set of candidate models, and the best model is picked. Furthermore, it is often necessary to compare trained and validated model, in order to take into account overfitting. Some models possess parameters that cannot be estimated from the data directly. They are called hyperparameters. One may rely on a validation set to find the best model. Here, one can divide the data into three subsets: one for training, one for validation, and one for testing. The splitting is also done in a random fashion. With the help of the validation set, one can find the model with the optimal hyperparameter values (i.e. a model selection), and the best model is finally evaluated on the test set. Note that the choice for the selection of the best prediction model, amongst a set of various candidate models, is made based on the performance measured on the test set. For example, one may need to decide if the logistic regression model, the decision tree, or the random forest is the best performing model. To make this decision, the performance on the test set is crucial. When the final prediction model is found, it may be put it into practice in the operational system for making predictions for new, previously unseen data. The term 'k-fold cross validation strategy" refers to an alternative to the simple train-test splitting. It corresponds to a repetitive train-test splitting, whereby the test set is shifted systematically. The obtained performances on the test sets are then averaged. The advantage of this strategy is that each observation will be once in the test set. Yet, more importantly, the estimated prediction performance becomes more reliable, which in turn provides a better picture of the generalization performance of the model.

According to a preferred embodiment, the trained anomaly detection algorithm comprises at least an unsupervised anomaly detection algorithm.

An unsupervised anomaly detection algorithm does not need previous knowledge of fraudulent and normal records. Such algorithms raise alarm for those transactions that are most dissimilar from the normal ones. Such technique uses a user behaviour-centred approach. Artificial neural nets can produce acceptable results for large enough transaction datasets. They, however, need a long training dataset. Self organizing map is an example of an unsupervised neural network learning technique, which provides a clustering method that is appropriate for constructing and analysing customer profiles.

Self organizing map operates in two phases: training and mapping. In the former phase, the map is built and weights of the neurons are updated iteratively, based on input samples. In the latter, test data is classified automatically into normal and fraudulent classes through the procedure of mapping. After training the self organizing map, new unseen transactions are compared to normal and fraud clusters, if it is similar to all normal records, it is classified as normal. New fraud transactions are also detected similarly. One of the advantages of using unsupervised neural networks over similar techniques is that these methods can learn from data stream. The more data passed to a self organizing map model, the more adaptation and improvement is shown by the model. More specifically, the self organizing map model adapts its model as time passes.

Therefore, self organizing map models and similar unsupervised anomaly detection algorithms can be used and updated online in banks or other financial corporations. Furthermore, unsupervised anomaly detection algorithms show fast and efficient detection off fraudulent activity. Also, unsupervised anomaly detection algorithm allow detection of anomalies that were previously unknown.

According to a preferred embodiment, the unsupervised anomaly detection algorithm is trained based on one or more transaction attributes of a plurality transactions comprised by a plurality of user profiles in the received plurality user profiles.

According to a preferred embodiment, the unsupervised anomaly detection algorithm is at least one or more of an isolation-based anomaly detection algorithm or a non-isolation-based anomaly detection algorithm. "Isolation-based anomaly detection algorithm," as used herein, is used as umbrella term for techniques such as iForest, SCiForest or iNNE (see below), i.e. algorithms that by means of isolation, are capable of directly modelling anomalies, unlike most other methods that identify anomalies as being deviations from an inferred region representing normal behaviour (see also Chandola et al. (2009)). Accordingly, "non-isolation-based anomaly detection algorithm," as used herein, refers to all other anomaly detection algorithms known in the state of the art, such as ORCA, local outlier factor or autoencoder model.

Preferably, the isolation-based anomaly detection algorithm is at least one or more of an iForest, SCiForest or iNNE model.

Most preferably, the isolation-based anomaly detection algorithm is at least an iForest model.

The isolation forest (iForest) model is proposed by Liu et al., in "Liu, F. T., Ting, K. M., & Zhou, Z.-H. (2008); Isolation Forest; In Proceedings of the Eighth IEEE International Conference on Data Mining (ICDM'08) (pp. 413-422)", below referred to as "Liu et al. (2008)". It is a nonparametric anomaly detection method since it does not make any assumptions about the data distribution. Despite the very simple design, the iForest algorithm is very competitive both in detection performance and time efficiency. The creators of iForest showed that their algorithm outperforms several other state-of-the-art anomaly detectors on various real-world data sets. Regarding iForest's scalability, complexity analysis presented in "Liu, F. T., Ting, K. M., & Zhou, Z.-H. (2012); Isolation-Based Anomaly Detection; ACM Transactions on Knowledge Discovery from Data (TKDD), 6 (1), 3:1-3:39", below referred to as Liu et al. (2012), revealed that it has a time complexity of $O(t\psi 2)$ for training and a time complexity of $O(n+\psi))$ for evaluation, which amounts to a total time complexity of $O(t\psi(n+\psi))$, where n denotes the number of instances in the data set. It is important to note that the training complexity does not involve any data-dependent variables, since the training complexity of iForest solely depends on its invariant and known input parameters. The space complexity of the isolation forest equals $O(t\psi)$. To summarize, iForest is a very scalable algorithm, and even when dealing with large data sets, it possesses a low linear time complexity with a low memory requirement. Furthermore, trees or iTrees play an important role in an iForest model, which is an unsupervised, tree-based ensemble method that applies the concept of isolation to anomaly detection. Isolation refers to the separation of each instance from the rest. By exploiting the basic property of anomalies to be "few and different," the notion of an isolation-based method is that anomalous instances are more easily separable than normal instances. Solely the tree structures of the learned ensemble are required to generate anomaly scores, hence this method avoids calculating computationally expensive distance or density measures. Overall, isolation is a better indicator for anomaly detection than distance and density. That is, normal data points close to the dense anomaly cluster exhibit a larger distance or lower density than the anomalous points, which is the opposite of the desired outcome, whereas isolation-based methods consistently assigned reasonable values to the anomalous and normal points.

An embodiment with iForest as unsupervised anomaly detection algorithm is particularly advantageous because it has been empirically proved (Liu et al. 2008, 2012) that iForest's detection performance, especially when the number of instances is larger than 1000, is superior to common state-of-the-art anomaly detection algorithms.

Since iForest, like many related algorithms, requires all attributes at its input to be numeric, a setup according to the state of the art is to convert nominal attributes to numeric attributes, and feed these converted attributes to the anomaly detection algorithm. Such a setup is found, e.g., in "Sun, L., Versteeg, S., Bortas, S., & Rao, A. (2016); Detecting Anomalous User Behavior Using an Extended Isolation Forest Algorithm: An Enterprise Case Study; CoRR, abs/1609.06676", referred to as "Sun et al. (2016)" below, the relevant portions of which are incorporated by reference. An advantage of the present invention is that by avoiding the conversion of nominal attributes to numeric attributes, the information present in the data set is taken into account in an undistorted way, leading to superior anomaly detection performance.

While anomaly detection algorithms such as ORCA (a distance-based method, see "Bay, S. D., & Schwabacher, M. (2003); Mining Distance-based Outliers in Near Linear Time with Randomization and a Simple Pruning Rule. In Proceedings of the Ninth ACM SIGKDD International Conference on Knowledge Discovery and Data Mining (pp. 29-38)"), LOF (Local Outlier Factor, a density-based method; see "Breunig, M. M., Kriegel, H.-P., Ng, R. T., & Sander, J. (2000); LOF: Identifying Density-based Local Outliers; In ACM Sigmod Record (Vol. 29, pp. 93-104)."), one-class SVM (Support Vector Machine, a model-based method; see "Schölkopf, B., Platt, J. C., Shawe-Taylor, J. C., Smola, A. J., & Williamson, R. C. (2001); Estimating the Support of a High-Dimensional Distribution; Neural Computation, 13 (7), 1443-1471"), and random forest with proximity matrices (a model-based method; see "Shi, T., & Horvath, S. (2006); Unsupervised Learning With Random Forest Predictors; Journal of Computational and Graphical Statistics, 15 (1), 118-138") can equally be applied in the present invention, iForest outperforms these methods when it comes to detection performance for large number of instances. The iForest algorithm is also able to effectively detect anomalies in high dimensional space, even when anomalous instances were not presented in the training sample. The algorithm is computational very efficient since it does not rely on the calculation of expensive distance or density measures. However, in the presence of local and/or clustered anomalies, anomaly detection capabilities of iForest are less effective in those circumstances. In fact, iForest primarily targets scattered anomalies since the derived anomaly score is computed globally which is not sensitive to the local data distributions. In alternative embodiments, SCiForest (Isolation Forest with Split-selection Criterion; see "Liu, F. T., Ting, K. M., & Zhou, Z.-H. (2010); On Detecting Clustered Anomalies Using SCiForest; In Proceedings of the European Conference on Machine Learning and Principles and Practice of Knowledge Discovery in Databases (ECML PKDD'10) (pp. 274-290)") or iNNE (Isolation using Nearest Neighbour Ensemble; see "Bandaragoda, T. R., Ting, K. M., Albrecht, D., Liu, F. T., & Wells, J. R. (2014); Efficient Anomaly Detection by Isolation Using Nearest Neighbor Ensemble; In Proceedings of the 2014 IEEE International Conference on Data Mining Workshop (ICDMW) (pp. 698-705)") may be applied in the anomaly detection step.

Preferably, the non-isolation-based anomaly detection algorithm is at least one or more of ORCA, local outlier factor or autoencoder model.

Most preferably, the non-isolation-based anomaly detection algorithm is at least an autoencoder model.

The autoencoder model is a type of artificial neural network used to learn efficient data coding in an unsupervised manner. The aim of an autoencoder is to learn a representation (encoding) for a set of data, typically for dimensionality reduction, by training the network to ignore signal 'noise'. Autoencoders are used as an anomaly detection algorithm. By learning to replicate the most salient features in the training data under some constraints, the model is encouraged to learn how to precisely reproduce the most frequent characteristics of the observations. When facing anomalies, the model should worsen its reconstruction performance. In most cases, only data with normal instances are used to train the autoencoder; in others, the frequency of anomalies is so small compared to the whole population of observations, that its contribution to the representation learnt by the model could be ignored. After training, the autoencoder will reconstruct normal data very well, while failing to do so with anomaly data which the autoencoder has not encountered. Reconstruction error of a data point, which is the error between the original data point and its low dimensional reconstruction, is used as an anomaly score to detect anomalies.

The autoencoder model may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation. The autoencoder model may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the UMLE may flag the feature vector as potentially fraudulent.

The autoencoder model may or may not be a variational autoencoder. The variational autoencoder may include the components of the autoencoder. The variational autoencoder may also include a constraint on its encoding network that forces it to generate vector representations of inputs according to a distribution (e.g., a unit Gaussian distribution).

According to a preferred embodiment, the trained anomaly detection algorithm comprises at least a supervised anomaly detection algorithm.

Supervised classification algorithms require samples of both fraudulent and non-fraudulent records, associated with respective labels to create a model. Such technique uses a fraud analysis-centred approach. Back propagation network is an example of a supervised classification algorithm. Such algorithm minimizes an objective function using a multi-stage dynamic optimization method that is a generalization of the delta rule. The back-propagation method is often useful for feed-forward network with no feedback. The back-propagation method is usually time-consuming and parameters like the number of hidden neurons and learning rate of delta rules require extensive tuning and training to achieve the best performance. In the domain of fraud detection, supervised neural networks like back-propagation are known as an efficient tool.

According to a preferred embodiment, the supervised algorithm is trained based on one or more transaction attributes of a plurality transactions comprised by a plurality of user profiles in a training data set. Preferably, wherein said training data set comprises a plurality of labels indicative of whether the training-related user profiles adhere to a predefined anomaly-relating criterion. More preferably, wherein said predefined anomaly-relating criterion is fraud-related.

According to a preferred embodiment, the supervised classification algorithm is one or more of a gradient boosting, XGboost, random forest or support vector model. Gradient boosting models, random forest models or support vector models may significantly improve performance. This is especially true if said models are trained on fraud transaction tags, i.e. identifying training transactions as fraudulent, rather than fraud account tags, i.e. identifying accounts as being used fraudulently. Furthermore, outcome of these models can be configured as scores that determine suspi-ciousness with respect to a specific type of money laundering, such as for example cash-oriented money laundering, foreign transfer-oriented money laundering, etc.

According to preferred embodiment, the anomaly detection algorithm comprises both an unsupervised anomaly detection algorithm and a supervised classification algorithm. Combining unsupervised and supervised algorithms allows stable and efficient detection of both unknown and known fraud patterns.

A community structure is determined for the received plurality user profiles. Preferably, the community structure is based at least in part on the transactions comprised by said received user profiles. Preferably, wherein the determined community structure comprises a plurality of nodes interconnected via weighted edges. Preferably, wherein each node is associated to a user profile. Preferably, wherein each node is further also associated to the respective calculated anomaly score for each user profile. Preferably, wherein the weight of each edge interconnecting two or more nodes is at least based in part on a number of transactions between the user profiles associated with the interconnected nodes.

"Community structure," "social structure" or "social network," as used herein, refers to a term known in the state of the art, which is generally referred to as a structure composed of entities, i.e. individuals or organizations referred to herein as users, that are interconnected through one or more interdependencies such as friendship, professional relations, communication exchanges, financial exchanges, etc. The community structure determined for the received plurality of user profiles herein is at least based at least in part on the transactions comprised by said received user profiles. Other parameters such as those discussed hereabove may or may not also be used in determining the community structure for the received plurality of user profiles. Different approaches and techniques for determining a community structure are known in the state of the art. Examples include: a cut-based perspective, which minimizes a constraint such as the number of links between groups of nodes; a clustering perspective, which maximizes internal density in groups of nodes; a stochastic block model perspective, which identifies groups of nodes in which nodes are stochastically equivalent; and a dynamical perspective, which identifies groups of nodes in which flows stay for a relatively long time such that they form building blocks of dynamics on networks. Further information on determining community structures is, for example, provided in "M. Rosvall, J. Delvenne, M. T. Schaub, and R. Lambiotte (2017); Different approaches to community detection," the relevant portions of which are incorporated by reference.

One embodiment of the present invention may or may not consider, in addition to transactions, call detail records or other historic data on voice and/or data calls between user in order to determine the community structure. Data calls in this context must be interpreted broadly to cover one or more of the exchange of text messages such as SMS messages or I-messages, chat threads such as WhatsApp messages, e-mail messages, pictorial information such as photos, e.g. through Instagram or Facebook, videoconferences or teleconferences, e.g. through Skype, etc. In addition to or as an alternative to voice and data communication information, the relationship information may comprise information indicative for the connectivity between entities in social network tools like LinkedIN, e.g. the distance or number of hops between persons in LinkedIN. Further, knowledge of family bonds (e.g. parents, children, grand-parents, etc.), kinship information (e.g. engagement, students, etc.), ownership (for instance between legal entities like companies, organizations, etc.) or membership information (of a sports club, arts academy, etc.), when available, can be exploited in addition to or as an alternative to voice/data communication information to establish relations between users and detect presence or absence of social networks.

A network anomaly score is calculated for a user profile associated to the suspect user. As discussed herein, said user profile is comprised by the received plurality user profiles.

The network anomaly score for said user profile is based at least in part on the anomaly score calculated for one or more user profiles associated with nodes in the determined community structure which are interconnected via an edge to the node of said user profile. The network anomaly score for said user profile is also based in part on the weight of each respective interconnecting edge. Such implementation takes into account the assumption that anomalous user, particularly fraudulent users, are often associated to other anomalous user and in particular fraudulent users. This is particularly true for users associated to money laundering.

A potential for anomalous activity by the suspect user is calculated by means of combining the calculated anomaly score and the network anomaly score of the user profile associated to the suspect user. A combination of an unsupervised and/or a supervised algorithm as well as a network anomaly score, determined as discussed hereabove, allows for a full spectrum analysis for detection of anomalous activities, which is particularly useful for fraud detection, more particularly for the detection of money laundering. Furthermore, such score is particularly useful and simple to use when determining whether the suspect user is potentially anomalous by means of comparing the calculated potential for anomalous activity to an anomaly threshold value. Preferably, wherein it is determined that the suspect user is potentially anomalous when the calculated potential exceeds the anomaly threshold value.

The anomaly threshold value may or may not be fixed. The anomaly threshold value is preferably variable. A variable anomaly threshold value may or may not variate based on an external parameter such as relevancy based on a feedback loop from a compliance investigation. Preferably, suspect user comprises a plurality of users associated with user profiles comprised by the provided plurality user profiles. More preferably, wherein each of the determined potentially anomalous suspect users are provided in a list.

According to preferred embodiment, the invention comprises the step of associating a weighting factor to the calculated anomaly score and the network anomaly score. Preferably, wherein the calculated anomaly score at least comprises two or more anomaly scores. Preferably, wherein at least each of said two or more anomaly scores is associated to a weighting factor. Preferably, wherein the anomaly score and the network anomaly score are weighted prior to combining the scores to calculate the potential for anomalous activity by the suspect user. Preferably, wherein the anomaly score and the network anomaly score are weighted by multiplying each score with each respective weighting factor.

According to preferred embodiment, the weighting factors are determined by means of a regression analysis method using validated anomalous activity cases. Preferably, wherein the regression analysis method at least comprises a logistic regression analysis. Preferably, fraud and specifically money laundering are indicated by detecting anomalies in transactions performed by a user. Accordingly, the validated anomalous activity cases are preferably validated fraud cases. Alternatively, weighting factors may or may not be averaged. Alternatively, weighting factors may or may not be determined by means of inter-model voting. Other techniques known in the art for determining inter-model weighting factors may also be applicable.

According to preferred embodiment, the invention comprising the step of providing validation data to the computer system for each determined potentially anomalous suspect user. Preferably, the validation data comprising a label indicative of whether a potentially anomalous suspect user was found anomalous. Preferably, the method comprising the step of calculating a success rate on the computer based at least in part on the provided validation data. Preferably, the method further comprising the step of retraining the trained anomaly detection algorithm if said success rate is lower than a success rate threshold value. Preferably, the anomaly detection algorithm being retrained based at least in part on the provided validation data. Preferably, the weighting factors are determined by means of a regression analysis method using validated anomalous activity cases, wherein the validated anomalous activity cases are at least based in part on said provided validation data.

Different scoring models may be performed concurrently, e.g. one supervised anomaly detection algorithm and one unsupervised classification algorithm. It is however desirable to minimize the number of said models which are retrained to improve the above success rate. Accordingly, the retraining can be performed of only one model without retraining the other scoring models.

The invention is further described by the following non-limiting examples which further illustrate the invention, and are not intended to, nor should they be interpreted to, limit the scope of the invention.

EXAMPLES

Example 1

Example 1 pertains to a standard process flow for fraud detection known in the art. This example is exemplified by FIG. 1.

The core of any standard fraud detection process flow lies in a monitoring tool (1.1) for determining alerts (1.2) which have to be investigated. The monitoring tool is commonly a rule-based detection engine. The alerts generated by said engine are also supplemented by alerts received from bank branches, police or court.

The compliance officer then creates a case for the alerts in a compliance case manager (1.3). Based on the 4-eyes principle, each of the alerts may (1.4) or may not (1.5) be investigated. If an alert is investigated, the compliance officer decides whether there is something suspicious about the alert and if yes whether it should (1.6) or should not (1.7) be reported to the Financial Intelligence Unit (FIU).

As discussed hereabove in the background, the rule-based system in the monitoring module is limited in its accuracy as it only takes into account a limited set of inputs. Furthermore, such systems are non-dynamic and hard to update.

Example 2

Figure 2:
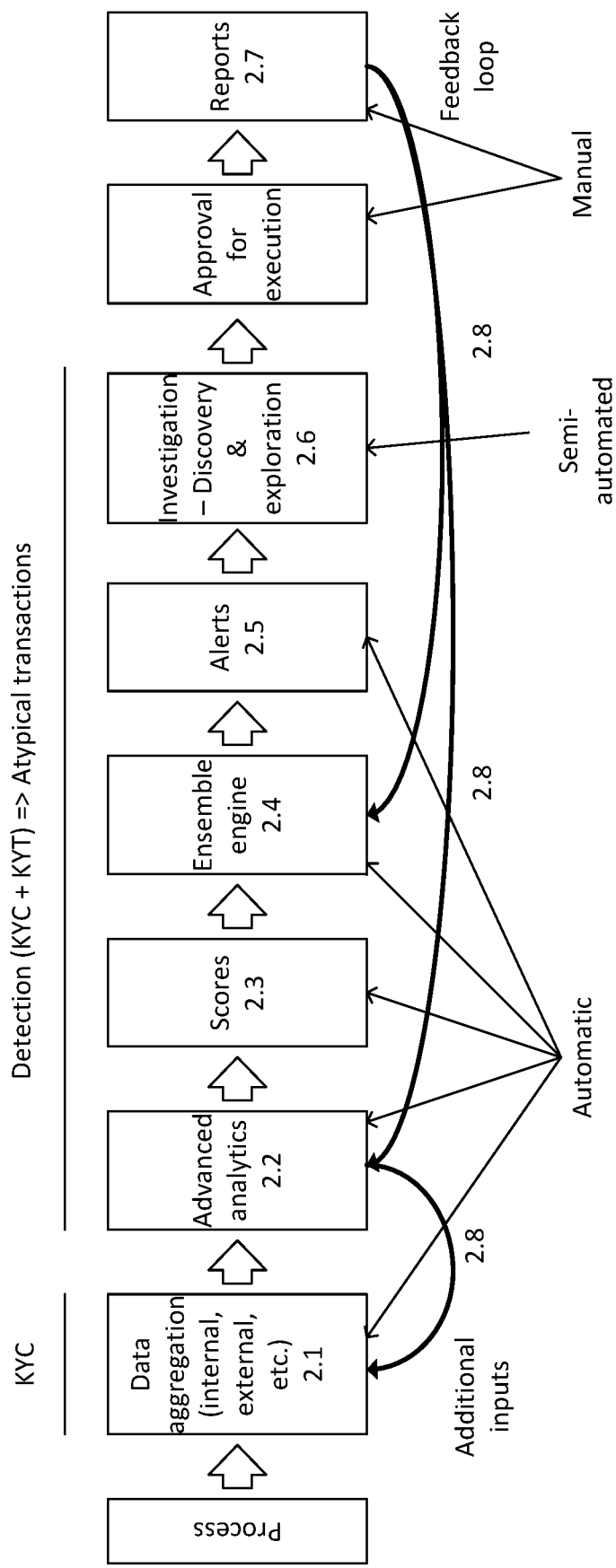
FIG. 2 shows a schematic overview of a method for fraud detection and optimizing detection according to the present invention.

Example 2 pertains to a method for fraud detection and optimizing detection according to the present invention. This example is exemplified by FIG. 2, which shows a schematic overview of the method.

Data Aggregation (2.1)

A user profile is constructed for each user. Each user profile comprising a plurality of transactions associated to each respective user. Each transaction comprising a plurality of transaction attributes. The transaction attributes according to the present invention comprising at least a merchant type, a transaction amount, a transaction location or a transaction time. Each user profile may also be supplemented by KYC (Know Your Customer) static data. Each user profile may also be supplemented by additional data including but not limited to:

- structured data—examples including external data from business registry, information about the neighbourhood where a customer lives or is present as well as derived data from internal sources (e.g. sources of income, more granular transactional pattern etc.);
- unstructured data—example can be paper invoices; and
- biometric data—example can be fingerprints or voice.

Each user profile preferably being defined over a time period. The time period being a random time period or a time period with a fixed length. According to the current example, the time period for each user profile is a time period with a fixed length. The fixed length preferably being equal to a time period before a user was reported to FIU or over randomly selected period of time of the same length for the users that were not reported. Furthermore, it is noted that the length of the time period can be configured of different timeframes or lengths which are combined together.

Advanced Analytics (2.2)

The core of the method for fraud detection according to the current example lies in an advanced analytics module for determining different scores (2.3) indicative of a potential for anomalous activity by a suspect user.

The module for determining different scores indicative of a potential for anomalous activity by a suspect user comprising the instructions for a) receiving a plurality of user profiles; b) calculating an anomaly score for each of the received plurality user profiles; c) determining a community structure for the received plurality of user profiles; and d) calculating a network anomaly score for a user profile associated to the suspect user. According to the current example, an anomaly score is calculated by both an unsupervised anomaly detection algorithm and a supervised classification algorithm. The unsupervised anomaly detection algorithm being trained based on one or more transaction attributes of a plurality transactions comprised by a plurality of user profiles in the received plurality user profiles. The supervised classification algorithm being trained based on one or more transaction attributes of a plurality transactions comprised by a plurality of user profiles in a training data set, wherein said training data set comprises a plurality of labels indicative of whether the training-related user profiles adhere to a predefined fraud-relating criterion.

Ensemble Engine (2.4)

The ensemble engine comprising instructions for e) calculating a potential for anomalous activity for the suspect user by combining each of the scores determine by the advanced analytics module.

According to the current example, each of the users associated to the received user profiles are a suspect user. Accordingly, each of steps d) and e) are repeated for each of said users to determine potential for anomalous activity. The ensemble engine also comprising instructions for f) determining whether each of the suspect users is potentially anomalous by comparing the calculated anomaly score to an anomaly threshold value for each of the suspect users.

The output of the ensemble engine according to the current example provides an alert (2.5) comprising a list of all the suspect users which were found potentially anomalous, i.e. each suspect user wherefore the calculated potential for anomalous activity exceeds the anomaly threshold value. The alert is subsequently investigated (2.6) by, for example, a compliance officer.

Reports (2.7)

After investigating the alert, validation data (2.8) is provided for each determined potentially anomalous suspect user. The validation data at least comprising a label indicative of whether a potentially anomalous suspect user was found anomalous.

A success rate can be calculated based at least in part on the provided validation data. If said success rate falls below a predetermined success rate threshold value, one or more of the trained anomaly detection algorithms are retrained based at least in part on the provided validation data. weighting factors can also be determined by means of a regression analysis method using the validated anomalous activity cases provided in the above validation data using a logistic regression analysis.

Implementation

The advanced analytics module and the ensemble engine according to the current example are provided in a computer program product, which is executable by a computer system, such as a server. The user profiles are provided to the computer program products from a database connected to the computer system.

The present invention is in no way limited to the embodiments described in the examples and/or shown in the figures. On the contrary, methods according to the present invention may be realized in many different ways without departing from the scope of the invention.

The invention claimed is:

1. A computer-implemented method for determining a potential for anomalous activity by a suspect user, comprising the steps of:
   a) receiving a plurality of user profiles at a processing unit, each of the user profiles associated with a user and comprising a plurality of transactions associated with the user, each of the transactions comprising a plurality of transaction attributes;
   b) calculating, using the processing unit, an anomaly score for each of the received user profiles to determine the potential for anomalous activity by the suspect user by means of an anomaly detection algorithm which is trained based on one or more of the transaction attributes of the transactions of the plurality of user profiles, wherein the trained anomaly detection algorithm is an unsupervised anomaly detection algorithm;
   characterized in that the method further comprises the steps of:
   c) determining a community structure for the received plurality of user profiles based at least in part on the transactions of the user profiles, wherein the determined community structure comprises a plurality of nodes interconnected via weighted edges, wherein each of the nodes represents an individual, entity, or organization associated with one of the user profiles, wherein the nodes are directly interconnected with each other based on relationships or exchanges in the community structure, wherein each of the nodes is associated with one of the user profiles and the calculated anomaly score for said user profile, wherein the weight of each of the edges interconnecting two or more of the nodes is at least based in part on a number of the transactions between the user profiles associated with the two or more of the nodes that are interconnected;
   d) calculating a network anomaly score for a user profile associated with the suspect user, wherein said user profile associated with the suspect user is part of the received plurality user profiles, wherein the network anomaly score for said user profile associated with the suspect user is based at least in part on the anomaly score calculated for one or more of the user profiles associated with the nodes in the determined community structure which are interconnected via the edge to the node of said user profile associated with the suspect user and the weight of each respective interconnecting edge; and e) calculating the potential for anomalous activity by the suspect user by combining the calculated anomaly score and the network anomaly score of the user profile associated to said suspect user.

2. The method according to claim 1, wherein the method further comprises a step of associating a weighting factor to the calculated anomaly score and the network anomaly score, wherein the anomaly score and the network anomaly score are weighted prior to combining the scores to calculate the potential for anomalous activity by the suspect user.

3. The method according to claim 2, wherein the anomaly score and the network anomaly score are weighted by multiplying the anomaly score and the network anomaly score by each respective weighting factor.

4. The method according to claim 2, wherein the weighting factors are determined using a regression analysis method using validated anomalous activity cases.

5. The method according to claim 4, wherein the regression analysis method at least comprises a logistic regression analysis, and wherein the validated anomalous activity cases are validated fraud cases.

6. The method according to claim 1, wherein said unsupervised algorithm is trained based on one or more transaction attributes of a plurality of transactions comprised by a plurality of user profiles in the received plurality of user profiles.

7. The method according to claim 1, wherein said unsupervised anomaly detection algorithm is at least one or more of an isolation-based anomaly detection algorithm or a non-isolation-based anomaly detection algorithm.

8. The method according to claim 7, wherein said isolation-based anomaly detection algorithm is at least one or more of an isolation forest (iForest), isolation forest with split-selection criterion (SCiForest) or isolation using nearest neighbour ensemble (iNNE) model.

9. The method according to claim 7, wherein said non-isolation-based anomaly detection algorithm is at least one or more of a distance-based, local outlier factor or autoencoder model.

10. The method according to claim 1, wherein the trained anomaly detection algorithm comprises a supervised anomaly detection algorithm and the unsupervised anomaly detection algorithm.

11. The method according to claim 10, wherein said supervised classification algorithm is one or more of a gradient boosting, random forest, support vector or extreme gradient boosting (Xgboost) model.

12. The method according to claim 11, wherein said supervised algorithm is trained based on one or more transaction attributes of a plurality of transactions comprised by a plurality of user profiles in a training data set, wherein said training data set comprises a plurality of labels indicative of whether the training-related user profiles adhere to a predefined anomaly-relating criterion, wherein said predefined anomaly-relating criterion is fraud-related.

13. The method according to claim 1, wherein the plurality of transaction attributes comprise one or more transaction attributes that include a merchant type, transaction amount, transaction location or transaction time.

14. A server for determining a potential for anomalous activity by the suspect user, configured for performing the computer-implemented method comprising the steps of:

a) receiving a plurality of user profiles, each of the user profiles associated with a user and comprising a plurality of transactions associated with the user, each of the transactions comprising a plurality of transaction attributes;

b) calculating, using a processing unit of the server, an anomaly score for each of the received user profiles to determine the potential for anomalous activity by the suspect user by means of an anomaly detection algorithm which is trained based on one or more of the transaction attributes of the transactions of the plurality of user profiles, wherein the trained anomaly detection algorithm is an unsupervised anomaly detection algorithm;

characterized in that the method further comprises the steps of:

c) determining a community structure for the received plurality of user profiles based at least in part on the transactions of the user profiles, wherein the determined community structure comprises a plurality of nodes interconnected via weighted edges, wherein each of the nodes represents an individual, entity, or organization associated with one of the user profiles, wherein the nodes are directly interconnected with each other based on relationships or exchanges in the community structure, wherein each of the nodes is associated with one of the user profiles and the calculated anomaly score for said user profile, wherein the weight of each of the edges interconnecting two or more of the nodes is at least based in part on a number of the transactions between the user profiles associated with the two or more of the nodes that are interconnected;

d) calculating a network anomaly score for a user profile associated with the suspect user, wherein said user profile associated with the suspect user is part of the received plurality user profiles, wherein the network anomaly score for said user profile associated with the suspect user is based at least in part on the anomaly score calculated for one or more of the user profiles associated with the nodes in the determined community structure which are interconnected via the edge to the node of said user profile associated with the suspect user and the weight of each respective interconnecting edge; and e) calculating the potential for anomalous activity by the suspect user by combining the calculated anomaly score and the network anomaly score of the user profile associated to said suspect user.

15. The method according to claim 1, wherein the anomalous activity is financial fraud or document fraud.

16. A non-transitory computer program product for determining a potential for anomalous activity by the suspect user, comprising instructions which, when executed by a computer, cause the computer to carry out the computer-implemented method comprising the steps of:

a) receiving a plurality of user profiles, each of the user profiles associated with a user and comprising a plurality of transactions associated with the user, each of the transactions comprising a plurality of transaction attributes;

b) calculating, using a processing unit of the computer, an anomaly score for each of the received user profiles to determine the potential for anomalous activity by the suspect user by means of an anomaly detection algorithm which is trained based on one or more of the transaction attributes of the transactions of the plurality of user profiles, wherein the trained anomaly detection algorithm is an unsupervised anomaly detection algorithm;

characterized in that the method further comprises the steps of:

c) determining a community structure for the received plurality of user profiles based at least in part on the transactions of the user profiles, wherein the determined community structure comprises a plurality of nodes interconnected via weighted edges, wherein each of the nodes represents an individual, entity, or organization associated with one of the user profiles, wherein the nodes are directly interconnected with each other based on relationships or exchanges in the community structure, wherein each of the nodes is associated with one of the user profiles and the calculated anomaly score for said user profile, wherein the weight of each of the edges interconnecting two or more of the nodes is at least based in part on a number of the transactions between the user profiles associated with the two or more of the nodes that are interconnected;

d) calculating a network anomaly score for a user profile associated with the suspect user, wherein said user profile associated with the suspect user is part of the received plurality user profiles, wherein the network anomaly score for said user profile associated with the suspect user is based at least in part on the anomaly score calculated for one or more of the user profiles associated with the nodes in the determined community structure which are interconnected via the edge to the node of said user profile associated with the suspect user and the weight of each respective interconnecting edge; and e) calculating the potential for anomalous activity by the suspect user by combining the calculated anomaly score and the network anomaly score of the user profile associated to said suspect user.

17. A method for detecting anomalous activity, comprising the steps of:

providing a plurality of user profiles to a computer system, each of the user profiles associated to a user and comprising a plurality of transactions by said user, each of the transactions comprising a plurality of transaction attributes;

executing the computer-implemented method according to claim 1 on a computer system;

obtaining the calculated potential for anomalous activity by the suspect user; and determining whether the suspect user is potentially anomalous by comparing the calculated potential for anomalous activity by the suspect user to an anomaly threshold value.

18. The method according to claim 17, wherein the suspect user is determined as potentially anomalous when the calculated potential for fraudulent activity exceeds the anomaly threshold value.

19. The method according to claim 17, wherein the suspect user comprises a plurality of users associated with user profiles that are part of the plurality of user profiles.

20. The method according to claim 19, further comprising the steps of:

providing validation data to the computer system for each determined potentially anomalous suspect user, the validation data comprising a label indicative of whether a potentially anomalous suspect user was found anomalous;

calculating a success rate on the computer based at least in part on the provided validation data; and retraining the trained anomaly detection algorithm if said success rate is lower than a success rate threshold value.

* * * * *